United States Patent
Matsushita et al.

(10) Patent No.: US 9,307,142 B2
(45) Date of Patent: Apr. 5, 2016

(54) IMAGING METHOD AND IMAGING APPARATUS

(71) Applicant: Olympus Corporation, Shibuya-ku, Tokyo (JP)

(72) Inventors: Tetsuya Matsushita, Chofu (JP); Sachie Yamamoto, Hino (JP); Kyoichi Numajiri, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/327,507

(22) Filed: Jul. 9, 2014

(65) Prior Publication Data

US 2015/0015742 A1  Jan. 15, 2015

(30) Foreign Application Priority Data

Jul. 10, 2013 (JP) ................................. 2013-144622

(51) Int. Cl.
*H04N 5/232* (2006.01)
*H04N 5/262* (2006.01)

(52) U.S. Cl.
CPC ....... *H04N 5/23219* (2013.01); *H04N 5/23245* (2013.01); *H04N 5/2621* (2013.01)

(58) Field of Classification Search
CPC .......... H04N 5/23219; H04N 5/23245; H04N 5/2621
See application file for complete search history.

(56) References Cited

U.S. PATENT DOCUMENTS

| 2005/0094019 | A1* | 5/2005 | Grosvenor | G03B 17/00 348/335 |
| 2009/0184849 | A1* | 7/2009 | Nasiri | A63F 13/211 341/20 |
| 2013/0229563 | A1* | 9/2013 | Ogino | H04N 5/23219 348/333.12 |
| 2014/0033138 | A1* | 1/2014 | Kim | H04N 5/23219 715/863 |
| 2014/0176416 | A1* | 6/2014 | Horowitz | G06F 3/017 345/156 |
| 2015/0145952 | A1* | 5/2015 | Hirata | H04N 5/23206 348/38 |

FOREIGN PATENT DOCUMENTS

| JP | 2003-244511 | 8/2003 |
| JP | 2004-254031 | 9/2004 |

* cited by examiner

*Primary Examiner* — Christopher K Peterson
(74) *Attorney, Agent, or Firm* — John C. Pokotylo; Straub & Pokotylo

(57) ABSTRACT

An imaging method includes photographing a subject to acquire image data, determining a pointing motion performed by a photographer included in the subject based on the image data, and outputting an instruction signal corresponding to the motion. The method further includes performing the photographing more than once to acquire image data based on the instruction signal, and creating a composite image based on the image data obtained by the performing the photographing more than once and the instruction signal.

20 Claims, 16 Drawing Sheets

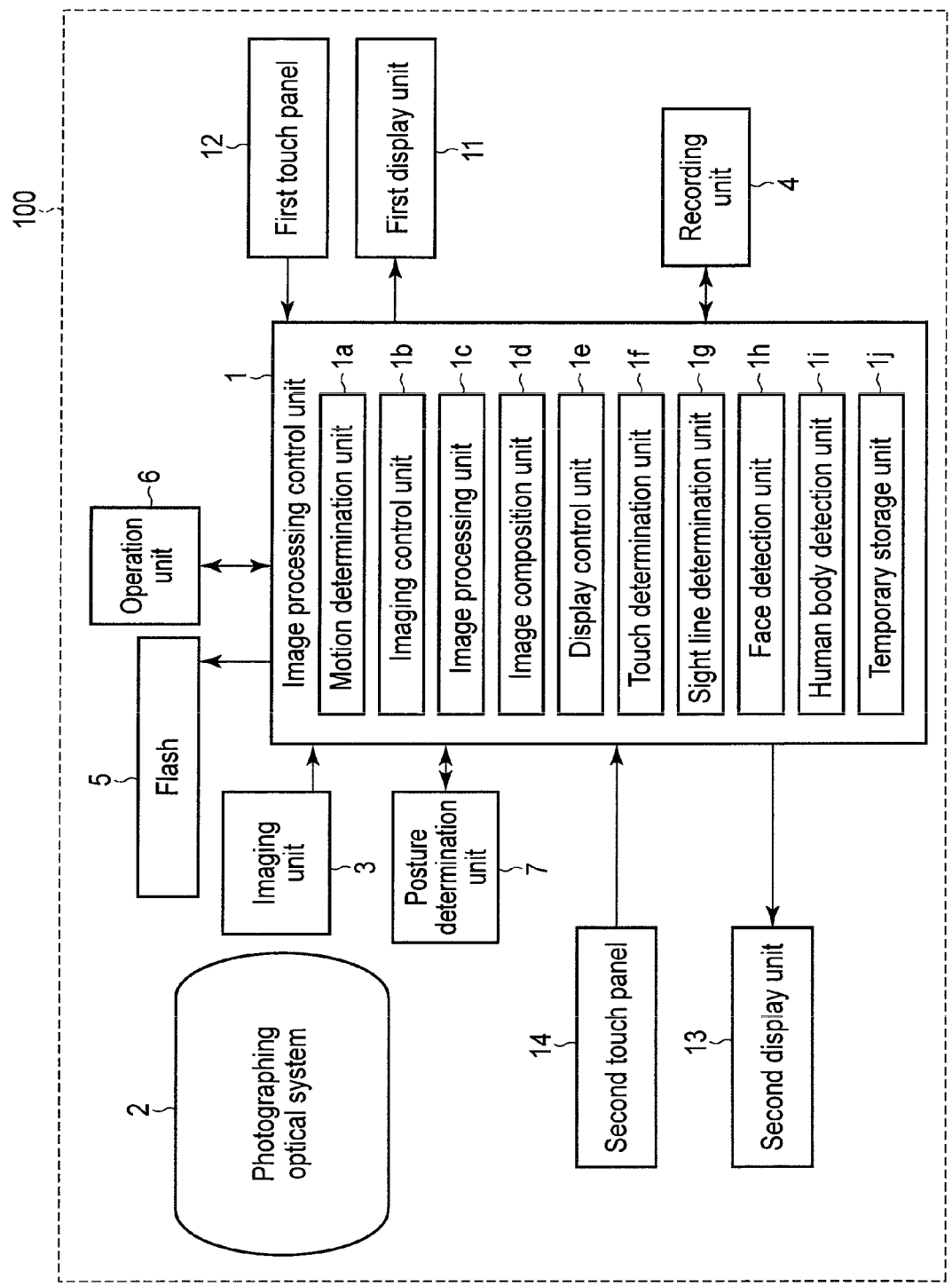
F I G. 1

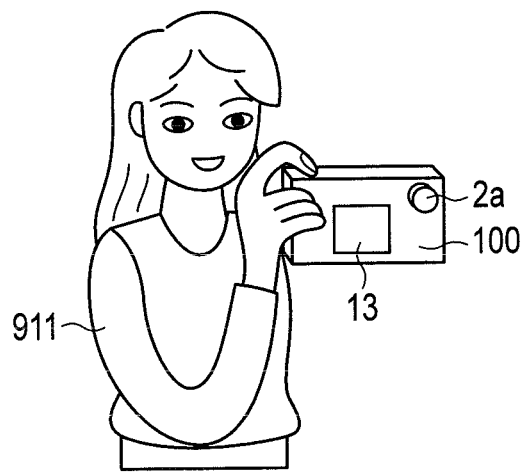
F I G. 2A
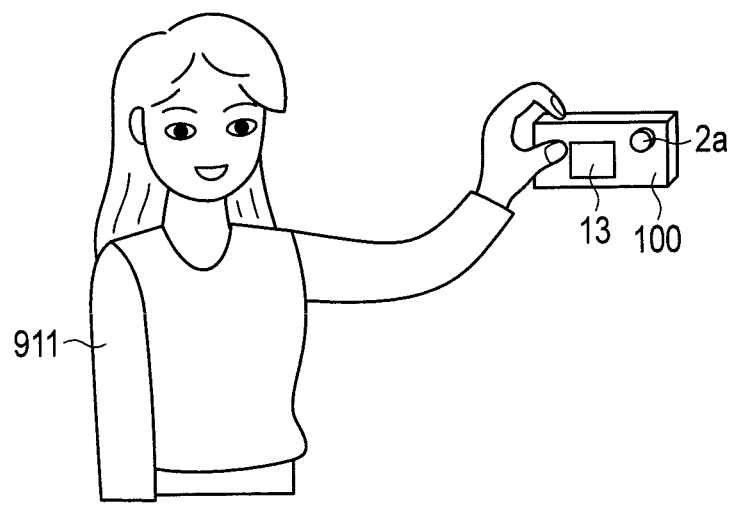
F I G. 2B

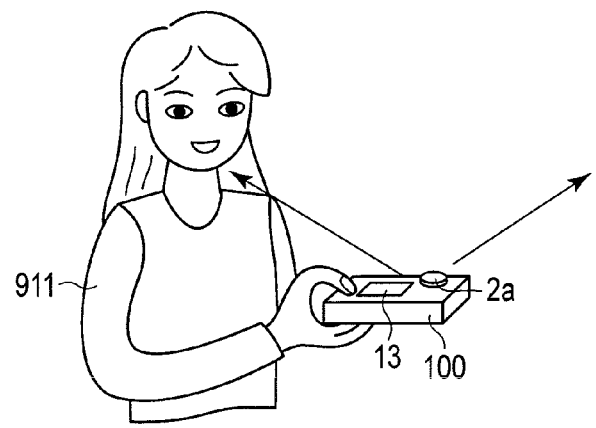
F I G. 2C
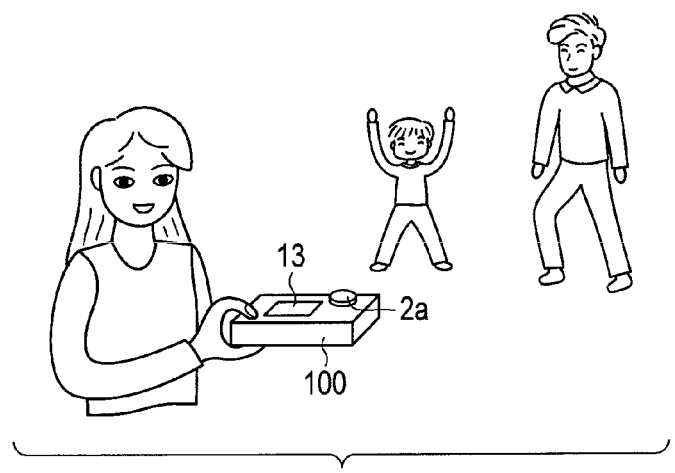
F I G. 3A
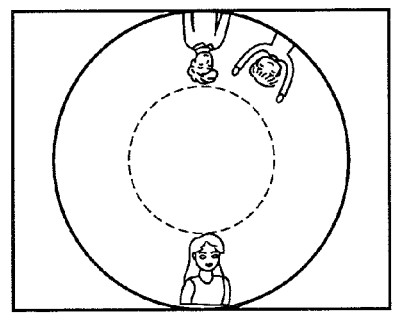
F I G. 3B

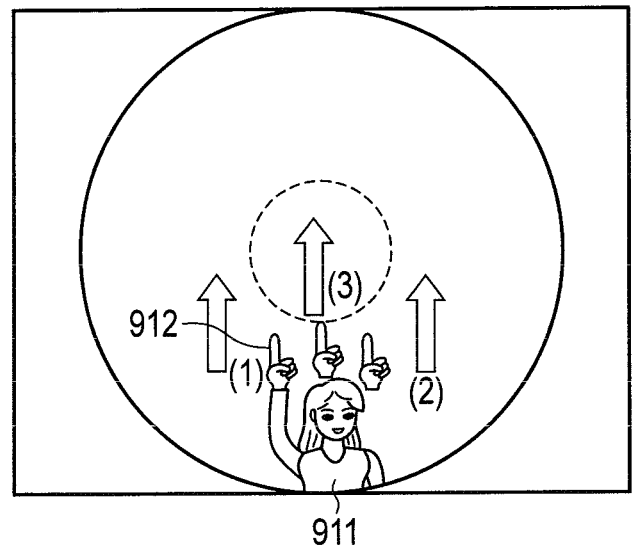
F I G. 9
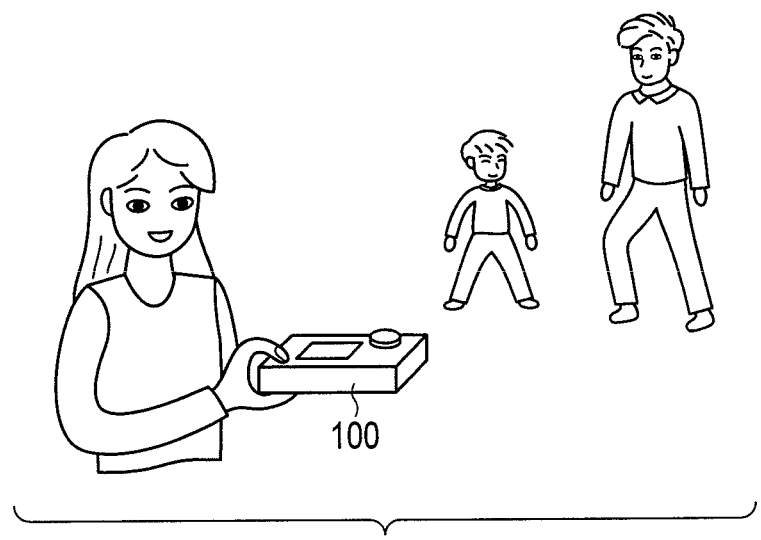
F I G. 10A

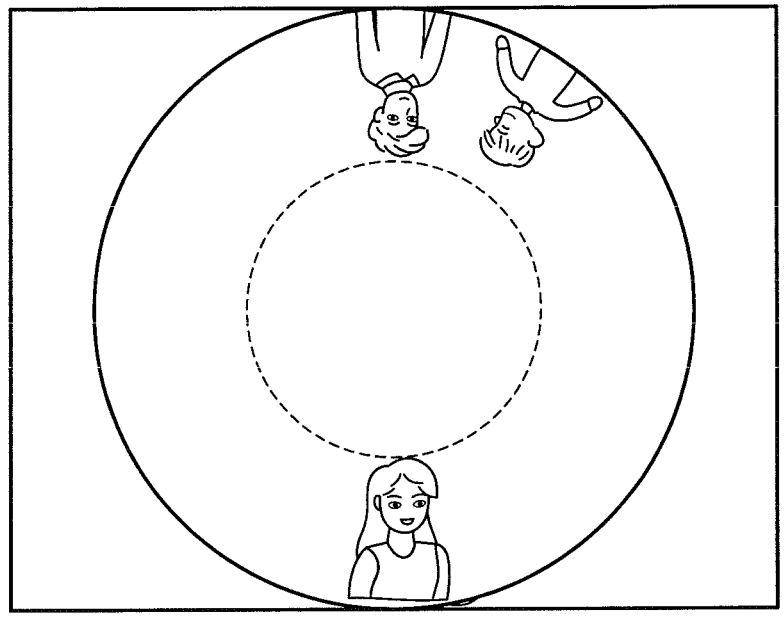
F I G. 10B
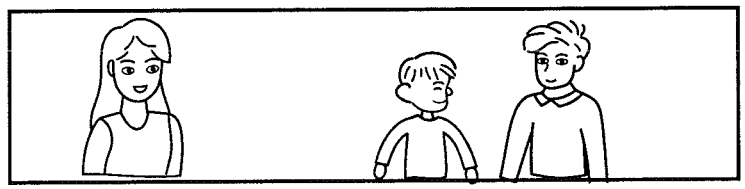
F I G. 10C

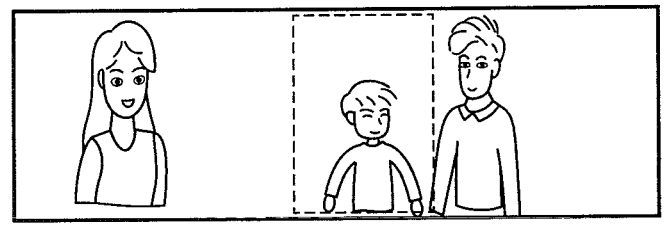
F I G. 12A
F I G. 12B
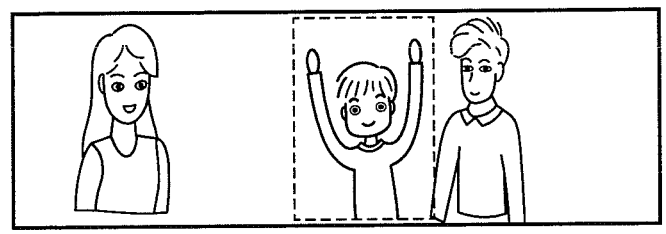
F I G. 12C

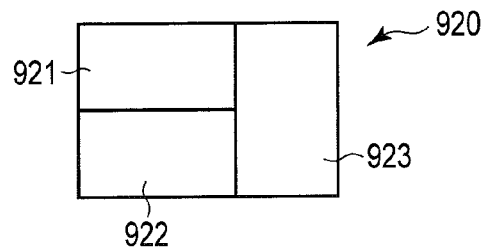
F I G. 13A
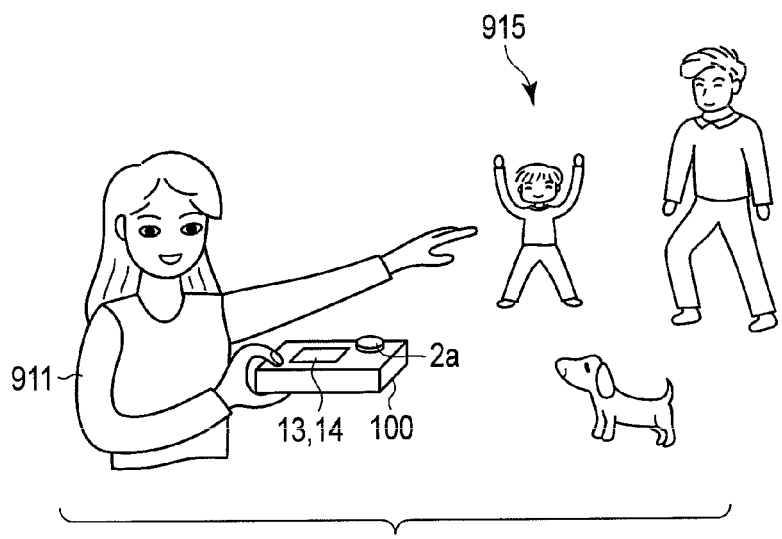
F I G. 13B
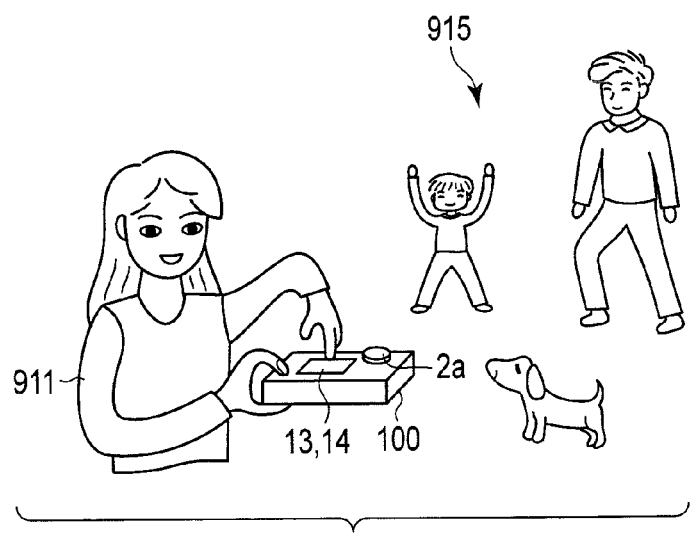
F I G. 13C

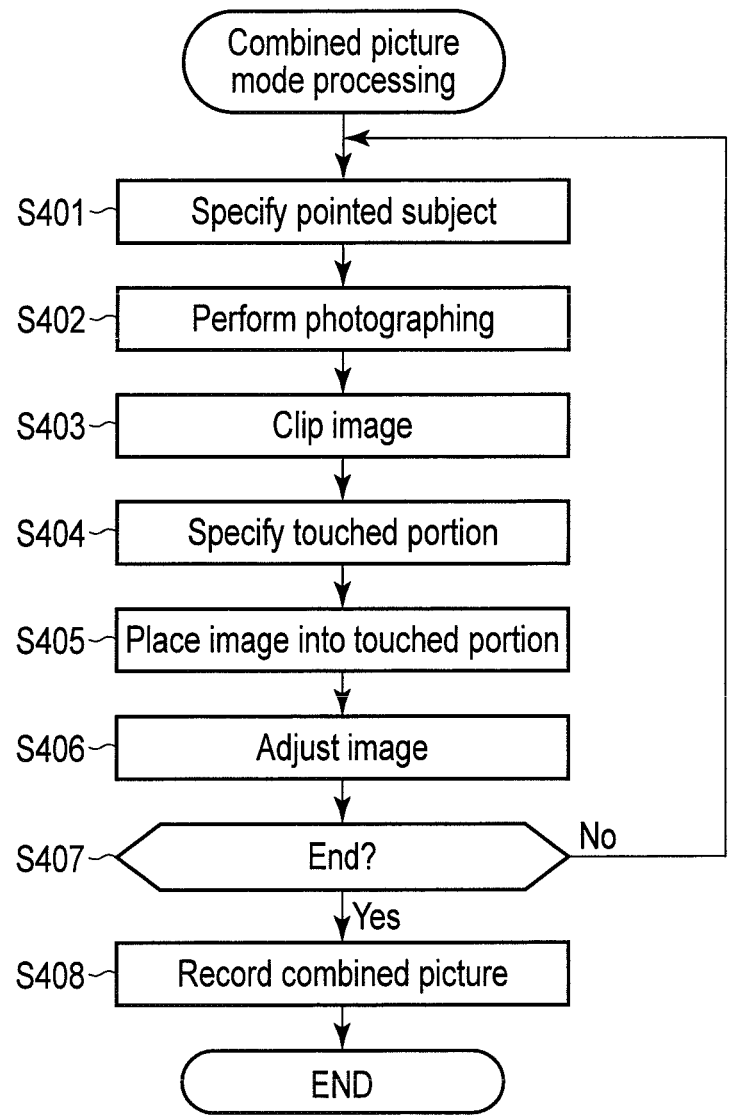
F I G. 14

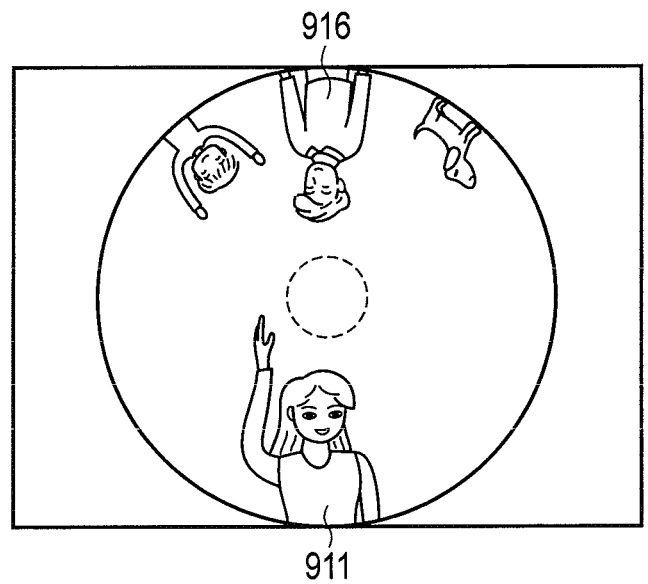
F I G. 15A
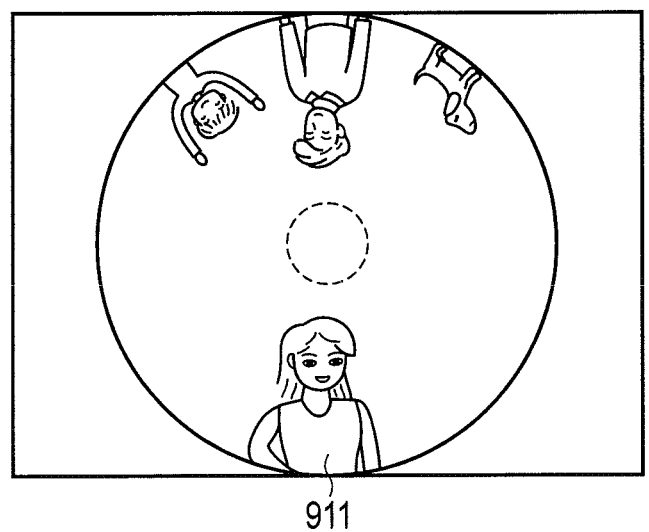
F I G. 15B

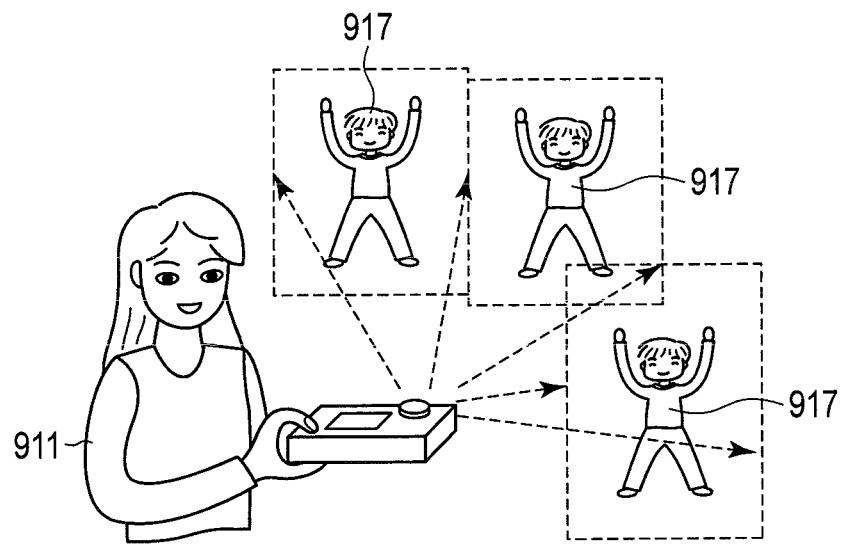
F I G. 18A
F I G. 18B

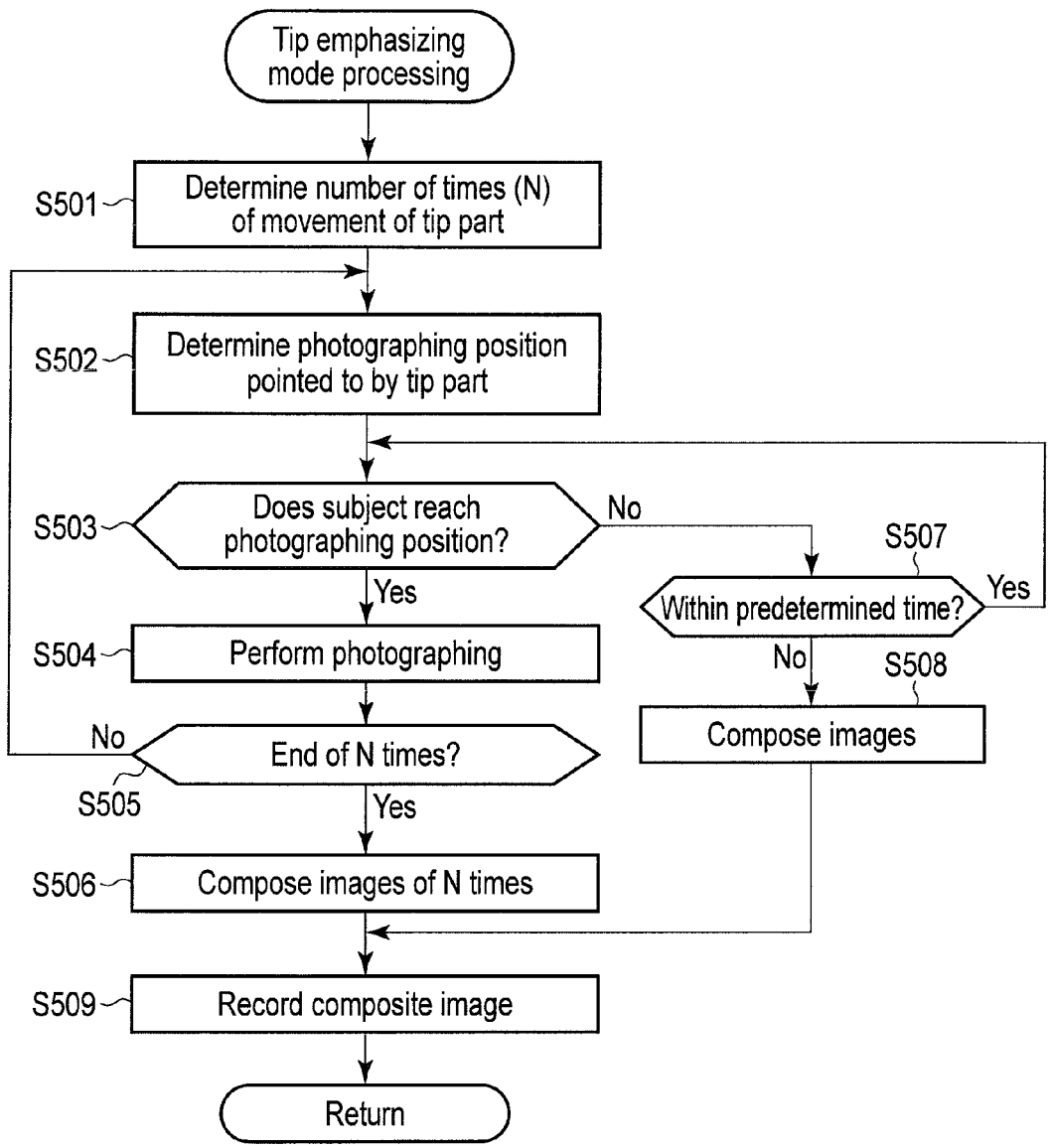
F I G. 19

IMAGING METHOD AND IMAGING APPARATUS

CROSS-REFERENCE TO RELATED APPLICATIONS

This application is based upon and claims the benefit of priority from prior Japanese Patent Application No. 2013-144622, filed Jul. 10, 2013, the entire contents of which are incorporated herein by reference.

BACKGROUND OF THE INVENTION

1. Field of the Invention

The present invention relates to an imaging apparatus and an imaging method.

2. Description of the Related Art

In general, various kinds of imaging apparatuses are known. For example, Jpn. Pat. Appln. KOKAI Publication No. 2003-244511 discloses the following technology concerning a digital camera. That is, in this digital camera, cameras are arranged in such a manner that optical axes thereof form a radial pattern. Such an arrangement enables this digital camera to perform omnidirectional photographing of 360 degrees by single photographing.

Further, for example, Jpn. Pat. Appln. KOKAI Publication No. 2004-254031 discloses a technology concerning a digital camera connected to the Internet. In the case of distributing an image acquired by this digital camera to many people, a camera control command corresponding to a camera operation is received from a client apparatus. The received control command is executed in accordance with a type of a camera, and an image based on a result of the execution is transmitted to the client apparatus. Consequently, the camera control can be performed by more than one person.

BRIEF SUMMARY OF THE INVENTION

According to an aspect of the present invention, an imaging method includes: photographing a subject to acquire image data; determining a pointing motion performed by a photographer included in the subject based on the image data; outputting an instruction signal corresponding to the motion; performing photographing more than once to acquire image data based on the instruction signal; and creating a composite image based on the image data obtained by the performing the photographing more than once and the instruction signal.

According to another aspect of the present invention, an imaging apparatus includes: an optical system which forms an image of light from a subject; an imaging unit which performs photographing for acquiring image data of the subject formed by the optical system; an operation determination unit which determines a pointing motion performed by a photographer included in the subject based on the image data and outputs an instruction signal corresponding to the motion; an imaging control unit which causes the imaging unit to perform the photographing more than once based on the instruction signal; and an image composition unit which creates a composite image based on the image data obtained by the photographing performed more than once and the instruction signal.

According to another aspect of the present invention, a non-transitory computer readable medium including a code which causes a computer to execute: photographing a subject to acquire image data; determining a pointing motion performed by a photographer included in the subject based on the image data; outputting an instruction signal corresponding to the motion; performing photographing more than once to acquire image data based on the instruction signal; and creating a composite image based on the image data obtained by the performing the photographing more than once and the instruction signal.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an outline of a configuration example of a digital camera according to an embodiment;

FIG. 2A is a view for explaining an example of a photographing method using a digital camera;

FIG. 2B is a view for explaining an example of the photographing method using a digital camera;

FIG. 2C is a view for explaining an example of the photographing method using a digital camera;

FIG. 3A is a view for explaining a photographic scene in full-surround photographing;

FIG. 3B is a view for explaining an image obtained by the full-surround photographing;

FIG. 9 is a view for explaining a gesture representing a tip emphasizing mode;

FIG. 10A is a view for explaining a subject in the full-member mode;

FIG. 10B is a view for explaining an image acquired in a scene in FIG. 10A;

FIG. 10C is a view for explaining an image acquired in the scene in FIG. 10A;

FIG. 12A is a view for explaining the full-member mode;

FIG. 12B is a view for explaining the full-member mode;

FIG. 12C is a view for explaining the full-member mode;

FIG. 13A is a view for explaining frames in a combined picture mode;

FIG. 13B is a view for explaining a motion of a photographer in the combined picture mode;

FIG. 13C is a view for explaining the motion of the photographer in the combined picture mode;

FIG. 14 is a flowchart showing an example of combined picture mode processing;

FIG. 15A is a view for explaining an image obtained in the combined picture mode;

FIG. 15B is a view for explaining an image obtained in the combined picture mode;

FIG. 18A is a view for explaining the tip emphasizing mode;

FIG. 18B is a view for explaining an image obtained in the tip emphasizing mode; and FIG. 19 is a flowchart showing an example of tip emphasizing mode processing.

DETAILED DESCRIPTION OF THE INVENTION

Figure 3C:
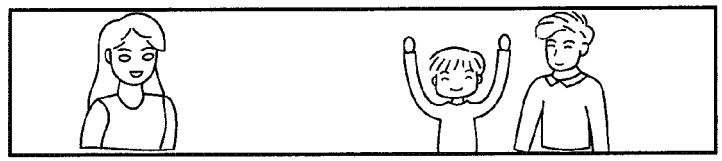
FIG. 3C is a view for explaining an image that can be obtained by performing image processing to an image obtained by the full-surround photographing.

An embodiment according to the present invention will now be described with reference to the drawings. FIG. 1 shows an outline of a configuration example of a digital camera 100 as an imaging apparatus according to this embodiment. As shown in FIG. 1, the digital camera 100 includes an image processing control unit 1, a photographing optical system 2, an imaging unit 3, a recording unit 4, a flash 5, an operation unit 6, a posture determination unit 7, a first display unit 11, a first touch panel 12, a second display unit 13, and a second touch panel 14.

The image processing control unit 1 controls operations of respective units in the digital camera 100 and executes various kinds of image processes. The imaging unit 3 includes an imaging element. The imaging element converts a subject image into an electrical signal based on photoelectric conversion. The imaging unit 3 outputs image data concerning the subject image. The photographing optical system 2 is an optical system that forms the subject image on the imaging element of the imaging unit 3. In this embodiment, the photographing optical system 2 includes a lens having an angle of view close to 180 degrees such as a wide-angle lens or a fish-eye lens in particular.

The recording unit 4 records image information processed by the image processing control unit 1. The flash 5 is a general flash. The operation unit 6 includes, e.g., a release button, various dials such as a mode selection dial, various button switches including a cross key, and others. The posture determination unit 7 includes, e.g., an acceleration sensor and detects a posture of the digital camera 100.

The first display unit 11 includes, e.g., a liquid crystal display element. The first display unit 11 is provided on a back side of the digital camera 100 that is a surface opposite to a surface where the photographing optical system 2 is provided. The first touch panel 12 is provided on the first display unit 11. The second display unit 13 includes, e.g., a liquid crystal distal element. The second display unit 13 is provided on a front surface of the digital camera 100 that is a surface where the photographing optical system 2 is provided. The second touch panel 14 is provided on the second display unit 13.

The image processing control unit 1 comprises an information processing apparatus including, e.g., a CPU, an ASIC, or other parts. The image processing control unit 1 includes a motion determination unit 1a, an imaging control unit 1b, an image processing unit 1c, an image composition unit 1d, a display control unit 1e, a touch determination unit 1f, a sight line determination unit 1g, a face detection unit 1h, a human body detection unit 1i, and a temporary storage unit 1j.

The motion determination unit 1a analyzes a motion of a photographer included in an image acquired from the imaging unit 3 and determines an operation of pointing to a subject by the photographer. The motion determination unit 1a creates and outputs an instruction signal concerning an operation of the photographer. The imaging control unit 1b causes the imaging unit 3 to perform a photographing operation based on the instruction signal output from the motion determination unit 1a. The image processing unit 1c performs various kinds of image processes to image data acquired from the imaging unit 3. The imaging composition unit 1d composes images based on pieces of image data obtained by the imaging unit 3 based on the instruction signal output from the motion determination unit 1a and creates a composite image.

The display control unit 1e controls display performed by the first display unit 11 and the second display unit 13. The touch determination unit 1f acquires a signal sensed by each of the first touch panel 12 and the second touch panel 14 and determines a touched position.

The sight line determination unit 1g detects a line of sight of a subject based on image data and determines whether the line of sight of the subject is directed toward the imaging optical system 2 of the digital camera 100. The face detection unit 1h detects a face included in an image acquired by the imaging unit 3. The human body detection unit 1i detects a human body included in the image acquired by the imaging unit 3. The temporary storage unit 1j temporarily stores various kinds of data used by the image processing control unit 1.

FIG. 2A, FIG. 2B, and FIG. 2C show an outline of an example of a photographing method using the digital camera 100 according to this embodiment. A photographer 911 can direct a lens 2a included in the photographing optical system 2 toward a subject and perform general photographing while watching the first display unit 11 provided on the back side to confirm the composition, as shown in FIG. 2A. Further, the photographer 911 can direct the lens 2a toward the photographer 911 herself/himself while watching the second display unit 13 and photograph herself/himself as shown in FIG. 2B. Furthermore, the photographer 911 can turn an optical axis of the photographing optical system 2 toward, e.g., the upper side and perform full-surround photographing while confirming the second display unit 13 as shown in FIG. 2C.

The situation where the full-surround photographing shown in FIG. 2C is performed will now be further described with reference to FIG. 3A, FIG. 3B, and FIG. 3C. As shown in FIG. 3A, when the full-surround photographing is carried out in a scene in which target subjects (persons) surround the digital camera 100 as shown in FIG. 3A; for example, such an image as shown in FIG. 3B is acquired. The digital camera 100 can record such an image as shown in FIG. 3B in the recording unit 4. Further, the digital camera 100 may execute image processing with respect to such an image as shown in FIG. 3B to create an image developed as shown in FIG. 3C and record this image in the recording unit 4.

The digital camera 100 according to this embodiment has various functions that are used when a photographer performs the full-surround photographing as shown in FIG. 2C. These functions include, e.g., a full-member mode, a combined picture mode, and a tip emphasizing mode which will be described later.

Figure 4:
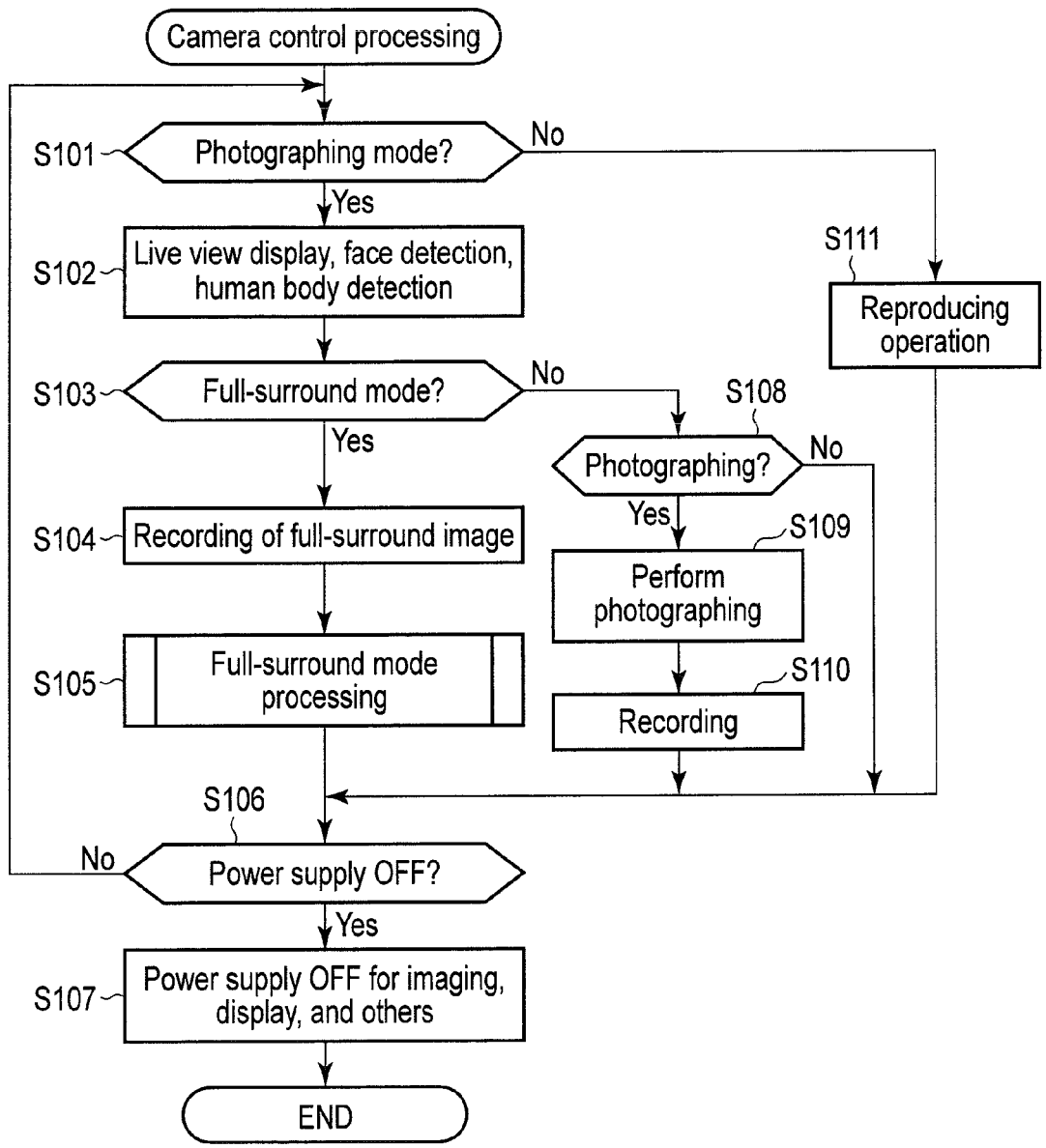
FIG. 4 is a flowchart showing an example of camera control processing.

An operation of the digital camera 100 will now be described with reference to a flowchart representing camera control processing depicted in FIG. 4. At step S101, the image processing control unit 1 determines whether a photographing mode is set. When the photographing mode is determined to be set, the processing advances to step S102. At step S102, the image processing control unit 1 carries out live view display, face detection, and human body detection. That is, the image processing control unit 1 acquires image data generated by the imaging unit 3. The image processing control unit 1 performs image processing with respect to the acquired image and generates a live view image to be displayed in the first display unit 11 or the second display unit 13. The image processing control unit 1 displays the live view image in the first display unit 11 or the second display unit 13. Moreover, the image processing control unit 1 detects a face or a human body included in the image based on the image data acquired from the imaging unit 3 by, e.g., a method called template matching.

At step S103, the image processing control unit 1 determines whether the full-surround mode is set. In this determination, the image processing control unit 1 acquires information concerning, e.g., a posture from the posture determination unit 7. For example, if an optical axis of the photographing optical system 2 is directed toward a zenith direction, the image processing control unit 1 determines that the full-surround mode is set. If the full-surround mode is determined to be set, the processing advances to step S104. At step S104, the image processing control unit 1 stores a full-surround image in the temporary storage unit 1j. At step S105, the image processing control unit 1 executes full-surround mode processing.

Figure 5:
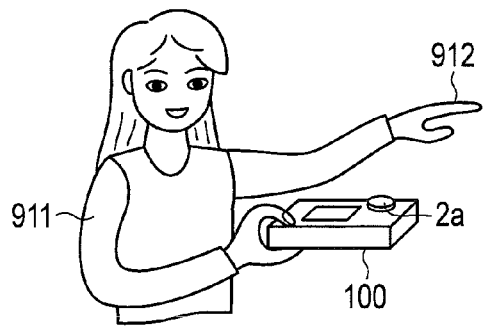
FIG. 5 is a view for explaining a gesture by which a photographer points to a subject.

The full-surround mode processing will now be described. In the full-surround mode processing, for example, as shown in FIG. 5, any one of the full-member mode, the combined picture mode, and the tip emphasizing mode to be executed is selected by a gesture of pointing to a subject by the photographer 911 using his/her finger 912.

Figure 6:
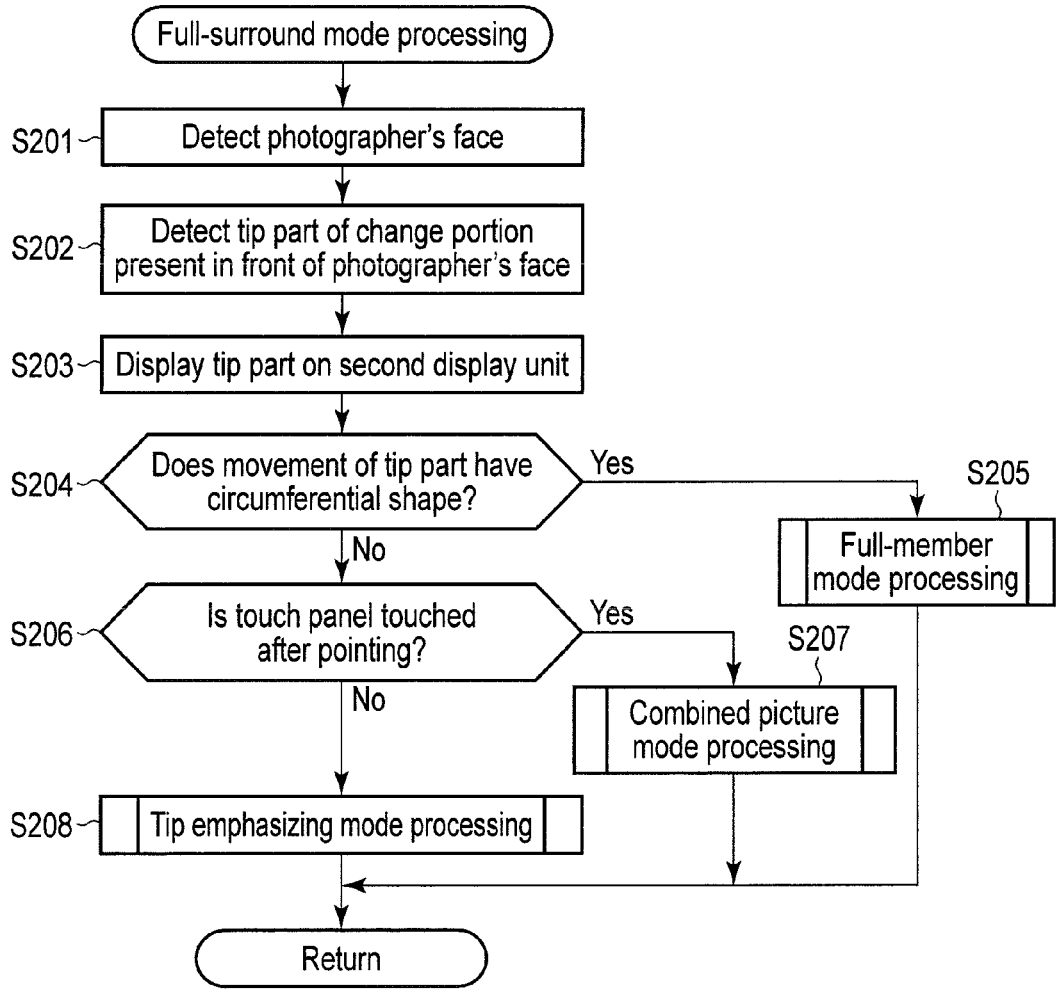
FIG. 6 is a flowchart showing an example of full-surround mode processing.

An operation concerning the full-surround mode processing will now be described with reference to a flowchart shown in FIG. 6. At step S201, the image processing control unit 1 detects a face of the photographer. At step S202, the image processing control unit 1 detects a change portion that is present in front of the photographer's face and which changes in position and detects a tip part of this change portion. As this tip part, for example, the photographer's fingertip is detected. At step S203, the image processing control unit 1 displays the tip part detected at step S202 in the second display unit 13 to show it to the photographer.

Figure 7:
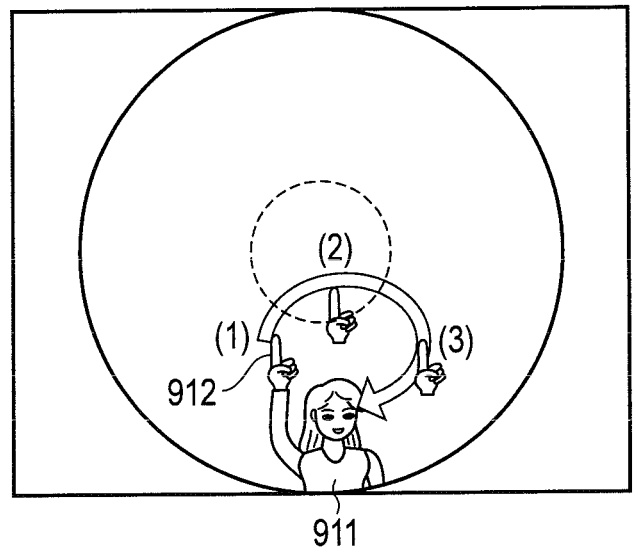
FIG. 7 is a view for explaining a gesture representing a full-member mode.

At step S204, the image processing control unit 1 determines whether movement of the tip part has a continuous circumferential shape. If the continuous circumferential shape is determined, the processing advances to step S205. Here, when the movement of the tip part has the continuous circumferential shape, it corresponds to, e.g., a case that is schematically shown in FIG. 7. That is, it is a case in which the photographer 911 moves his/her finger 912 in the circumferential shape in the order of (1), (2), and (3), for example. At step S205, the image processing control unit 1 executes the full-member mode processing. The full-member mode processing will be described later. Then, the processing returns to the camera control processing described with reference to FIG. 4.

Figure 8:
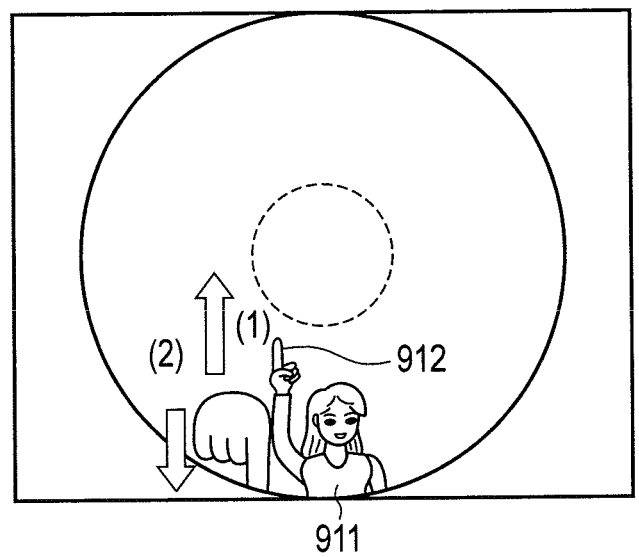
FIG. 8 is a view for explaining a gesture representing a combined picture mode.

At step S204, if the movement of the tip part is not determined to have the continuous circumferential shape, the processing advances to step S206. At step S206, the image processing control unit 1 determines whether the movement of the tip part is pointing and then the second touch panel 14 is touched. If the touching after pointing is determined, the processing advances to step S207. Here, the touching after pointing corresponds to, e.g., a case which is schematically shown in FIG. 8. That is, the photographer 911 first points to a subject as indicated by (1) and then touches the second touch panel 14 as indicated by (2).

At step S207, the image processing control unit 1 executes combined picture mode determination processing. The combined picture mode will be described later. Subsequently, the processing returns to the camera control processing described with reference to FIG. 4.

At step S206, if the movement of the tip part is not determined to be the touching after the pointing, the processing advances to step S208. Here, if the touching after the pointing is not determined, it corresponds to, e.g., a case schematically shown in FIG. 9. That is, for example, it can be considered that the photographer 911 sequentially points to the subject with his/her finger 912 in the order of (1), (2), and (3). That is, the photographer 911 repeats pointing to the subject with his/her finger 912 like (1), interposing a separating motion, e.g., raising the finger 912, and pointing to the subject with the finger 912 like (2).

At step S208, the image processing control unit 1 carries out the tip emphasizing mode processing. The tip emphasizing mode processing will be described later. Then, the processing returns to the camera control processing described with reference to FIG. 4.

The full-member mode processing will now be described. In the full-member mode, such an image as described with reference to FIG. 3A, FIG. 3B, and FIG. 3C is created. At the time of acquiring such an image as shown in FIG. 3C, for example, a situation in which the all persons as subjects are not looking at the digital camera 100 can be considered as shown in FIG. 10A. In this situation, such an image as shown in FIG. 10B is acquired, and such an image as shown in FIG. 10C is created. However, a photograph in which all persons are looking at the digital camera 100, i.e., a photograph having lines of sight from all persons is often desired. Thus, in the full-member mode, the digital camera 100 performs photographing more than once, composes photographs, and creates a photograph in which all persons are looking at the digital camera 100.

Figure 11:
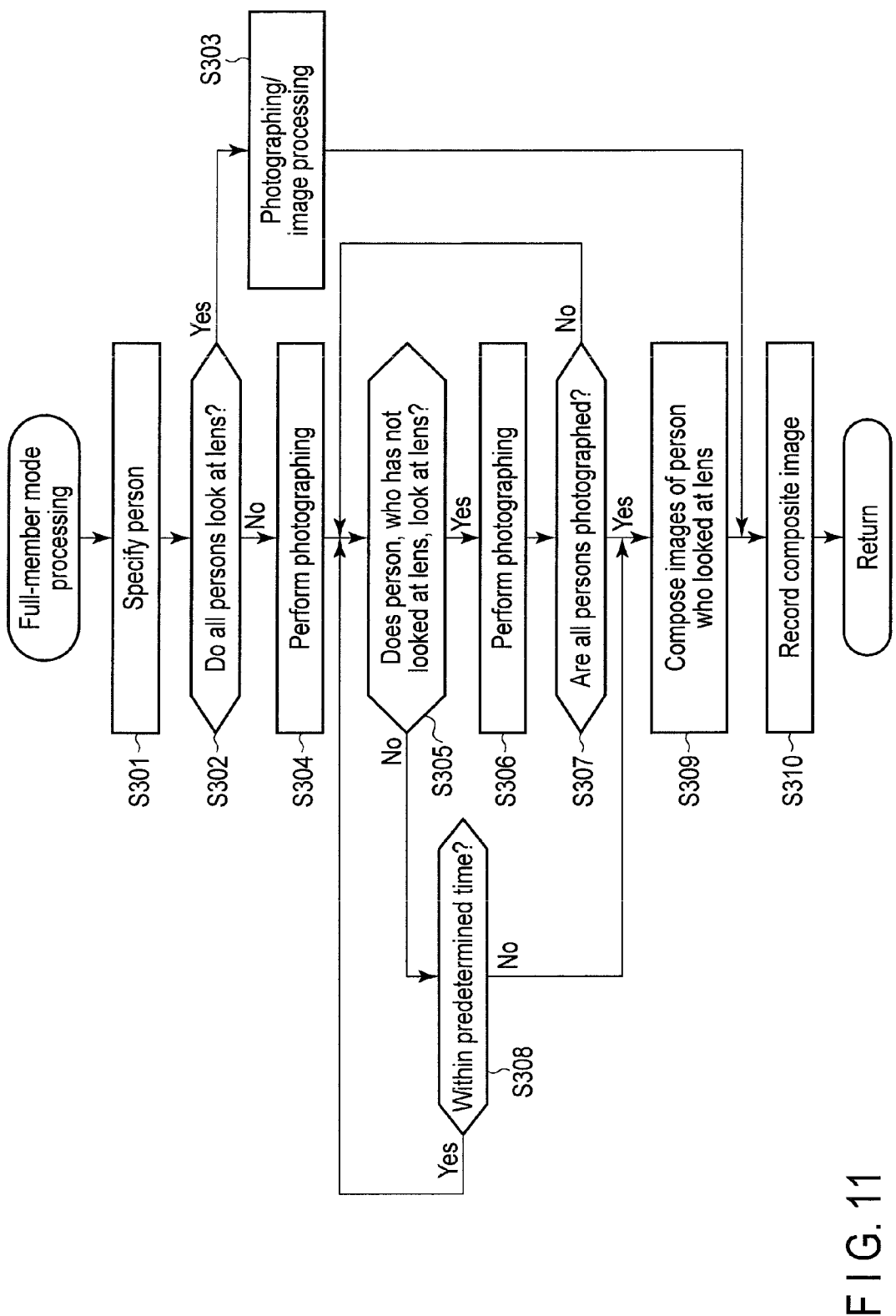
FIG. 11 is a flowchart showing an example of full-member mode processing.

The full-member mode processing will now be described with reference to a flowchart shown in FIG. 11. At step S301, the image processing control unit 1 specifies each person included in a photographing range. At step S302, the image processing control unit 1 determines whether all persons are looking at the lens. If all the persons are determined to be looking at the lens, the processing advances to step S303.

At step S303, the image processing control unit 1 executes the photographing operation. That is, the image processing control unit 1 causes the imaging unit 3 to acquire a subject image. The image processing control unit 1 acquires image data from the imaging unit 3. The image processing control unit 1 executes general image processing or any other image processing including creation of such an image as shown in FIG. 3C from such an image as shown in FIG. 3B with respect to the acquired image data and thereby creates a recording image to be recorded. Then, the processing advances to step S310.

At step S302, if all the persons are not determined to be looking at the lens, the processing advances to step S304. At step S304, the image processing control unit 1 executes the photographing operation. That is, the image processing control unit 1 causes the imaging unit 3 to acquire a subject image. The image processing control unit 1 acquires image data obtained from the imaging unit 3.

At step S305, the image processing control unit 1 determines whether a person who has not looked at the lens in the photographing in step S304 looks at the lens. If the person is determined to look at the lens, the processing advances to step S306. For example, the image processing control unit 1 may be configured to determine that the subject looks at the lens when he/she saw the area within a radius of 30 cm with the lens at the center. At step S306, the image processing, control unit 1 executes the photographing operation.

At step S307, the image processing control unit 1 determines whether all the persons included in the photographing range are photographed in a state that they look at the lens at least once. If all the persons are determined to have been photographed, the processing advances to step S309. On the other hand, if the all the persons are not determined to have been photographed, the processing returns to step S305.

In the determination of step S305, if it is determined that the person who has not looked at the lens does not look at the lens, the processing advances to step S308. At step S308, the image processing control unit 1 determines whether an elapsed time from, e.g., the photographing in step S304 or the latest photographing is within a predetermined time. If the elapsed time is determined to be within the predetermined time, the processing returns to step S305. On the other hand, if the elapsed time is not determined to be within the predetermined time, the processing advances to step S309, At step S309, the image processing control unit 1 composes images of persons who are looking at the lens in the images acquired at step S304 and step S306 and thereby creates an image in which all the persons are looking at the lens. Then, the processing advances to step S310. At step S310, the image processing control unit 1 records the composite image created at step S309 or the image created at step S303 in the recording unit 4. Then, the processing returns to the full-surround mode processing described with reference to FIG. 6.

For example, when a first image acquired at step S304 is as shown in FIG. 12A, a child in the middle is not looking at the digital camera 100. In such a case, in the full-member photographing mode, when this child is looking at the digital camera 100, the photographing is again performed at step S306. At step S310, the digital camera 100 clips a child portion from the acquired image as shown in FIG. 12B and composes it with, e.g., the image in FIG. 12A. As a result, such an image having all lines of slight from all the persons as shown in FIG. 12C is created.

According to the full-member mode processing of this embodiment, a picture in which all the persons are looking at the digital camera 100 at the same time is obtained. In general, such a picture in which all the persons are looking at the digital camera 100 is preferred.

The combined picture mode processing will now be described. In the combined picture mode, for example, as shown in FIG. 13A, a combined picture in which frames such as a first frame 921, a second frame 922, and a third frame 923 are included in one image 920 is created. In the combined picture mode according to this embodiment, the photographer 911 points to a subject 915 as shown in FIG. 13B, and then he/she touches a frame displayed in the second display unit 13 as shown in FIG. 13C. The touched position is detected by the second touch panel 14 provided on the second display unit 13. The digital camera 100 places an image of the subject 915 pointed to by the photographer 911 into the frame touched by the photographer 911 in response to such an operation of the photographer, thereby creating the combined picture.

The combined picture mode processing will now be described with reference to a flowchart shown in FIG. 14. At step S401, the image processing control unit 1 specifies a subject pointed to by the photographer. For example, in such a scene as shown in FIG. 13B, an image like FIG. 15A is acquired. Based on this image, the image processing control unit 1 specifies a subject 916 pointed to by the photographer 911. At step S402, the image processing control unit 1 executes the photographing operation. At step S403, the image processing control unit 1 clips an image of the subject pointed to specified at step S401 from the image obtained by the photographing operation.

At step S404, the image processing control unit 1 acquires information concerning the touched position from the second touch panel 14 and specifies a touched portion. It is to be noted that the image acquired by the imaging unit 3 is as shown in, e.g., FIG. 15B. At step S405, the image processing control unit 1 places the image clipped at step S402 into a frame corresponding to a touched region specified at step S404. At step S406, the image processing control unit 1 acquires information concerning the touched position from the second touch panel 14 and executes image adjustment such as enlargement or contraction of an image in accordance with the touched position.

At step S407, the image processing control unit 1 determines whether the processing is to be terminated. If the termination is not determined, the processing returns to step S401. On the other hand, if the termination is determined, the processing advances to step S408. At step S408, the image processing control unit 1 records the created combined picture in the recording unit 4.

Figure 16:
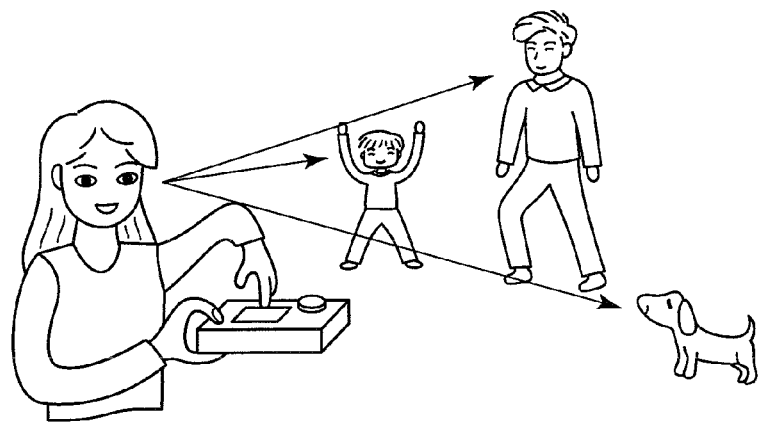
FIG. 16 is a view for explaining a motion of the photographer in the combined picture mode.
Figure 17A:
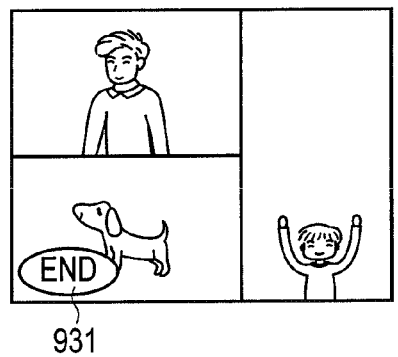
FIG. 17A is a view for explaining an image obtained in the combined picture mode.
Figure 17B:
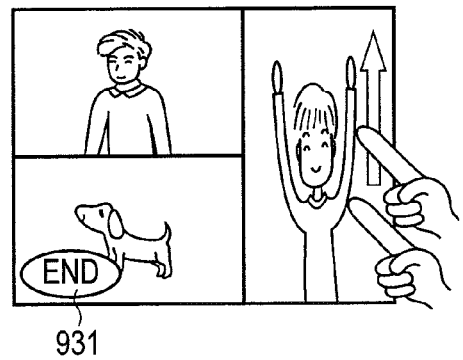
FIG. 17B is a view for explaining an image obtained in the combined picture mode.

According to this embodiment, as shown in FIG. 16, when photographing of the subject and specification of a frame into which an image of the subject is placed are sequentially performed, for example, such a combined picture as shown in FIG. 17A is created. Furthermore, when the image adjustment is executed at step S406, for example, such an image as shown in FIG. 17A can be changed to such an image as shown in FIG. 17B. Moreover, for example, creation of the combined picture may be configured to be terminated when an END indication 931 shown as "END" depicted in FIG. 17A or FIG. 17B is touched. At this time, the determination upon whether the termination is to be effected at step S407 is determination upon whether this END indication 931 is touched.

According to the combined picture mode processing of this embodiment, the photographer can easily create such a combined picture as shown in FIG. 17B by a sensing operation.

It is to be noted that the description has been given on the example where the frame into which the acquired image is to be placed in the combined picture is selected by the photographer using the second touch panel 14. However, the present invention is not restricted thereto. For example, the order of frames into which images are placed may be preset, and images of subjects pointed to by the photographer may be configured to be placed in accordance with the order.

The tip emphasizing mode processing will now be described. The tip emphasizing mode processing is used for photographing in a scene in which a subject 917 sequentially moves as shown in FIG. 18A. In such a case, the digital camera 100 executes the photographing operation when the subject 917 has moved to a position specified by the photographer 911, composes obtained images of the subject 917, and creates such a composite image as shown in FIG. 18B.

The tip emphasizing mode processing will now be described with reference to a flowchart shown in FIG. 19. At step S501, the image processing control unit 1 determines the number of times of movement of the tip portion of the photographer. Here, this number of times is determined as N. At step S502, the image processing control unit 1 determines a photographing position designated by the tip portion.

At step S503, the image processing control unit 1 determines whether the subject reaches the photographing position. If the subject is determined to reach the photographing position, the processing advances to step S504. At step S504, the image processing control unit 1 executes the photographing operation.

At step S505, the image processing control unit 1 determines whether the photographing is performed N times. If the photographing is not determined to have been performed N times, the processing returns to step S502. On the other hand, if the photographing is determined to have been performed N times, the processing advances to step S506. At step S506, the image processing control unit 1 composes images obtained by the photographing operation performed N times and thereby creates a composite image. Then, the processing advances to step S509.

If the subject is not determined to reach a photographing position in the determination of step S503, the processing advances to step S507. At step S507, the image processing control unit 1 determines whether an elapsed time is within a predetermined time from start of the tip emphasizing mode processing or the previous photographing operation. If the elapsed time is determined to be within the predetermined time, the processing returns to step S503. On the other hand, if the elapsed time is not determined to be within the predetermined time, the processing advances to step S508. At step S508, the image processing control unit 1 composes the acquired images to create a composite image. In the composite processing executed at step S506 or step S508, for example, images in the range of 15 degrees on each of left and right sides, i.e., 30 degrees in total with a subject at the center are composed.

After the processing of step S508, the processing advances to step S509. At step S509, the image processing control unit 1 records the created composite image in the recording unit 4. Subsequently, the processing returns to the full-surround mode processing described with reference to FIG. 6.

According to the tip emphasizing mode processing of this embodiment, the photographer can easily take such a pleasant and interesting picture as shown in FIG. 18B by a sensing operation.

Again referring to FIG. 4, the description will be continued. After the full-surround mode processing described with reference to FIG. 6, processing advances to step S106. At step S106, the image processing control unit 1 determines whether a power supply is turned off. If the power supply is not determined to be turned off, the processing returns to step S101. On the other hand, if the power supply is determined to be turned off, the processing advances to step S107. At step S107, the image processing control unit 1 turns off the power supply for each unit concerning imaging or each unit concerning display. Subsequently, the camera control processing is terminated.

At step S103, if the full-surround mode is not determined, the processing advances to step S108. At this time, the general photographing operation performed as shown in FIG. 2A or FIG. 2B is executed. At step S108, the image processing control unit 1 determines whether the general photographing operation such as pressing a release button or a touch release operation is performed. If the photographing operation is not determined to be performed, the processing advances to step S106. On the other hand, if the photographing operation is determined to be performed, the processing advances to step S109. At step S109, the image processing control unit 1 executes the photographing operation. That is, the image processing control unit 1 acquires image data from the imaging unit 3 and executes the image processing based on the image data. At step S110, the image processing control unit 1 records an image created at step S109 in the recording unit 4. Then, the processing advances to step S106.

At step S101, if the photographing mode is not determined, the processing advances to step S111. At step S111, the image processing control unit 1 executes a reproducing operation. That is, the image processing control unit 1 reads out the image data recorded in the recording unit 4 and displays thumbnail images one by one or at the same time in the first display unit 11. Then, the processing advances to step S106.

As described above, in the full-surround mode, the digital camera 100 according to this embodiment can perform different types of photographing depending on the full-member mode, the combined picture mode, and the tip emphasizing mode. In the photographing in these modes, the photographer can intuitively and easily take a fascinating picture by using a gesture of pointing to a subject. Further, these modes can be selected by the photographer's gesture of pointing to a subject. Therefore, the photographer can easily select each mode by the gesture of pointing to a subject.

In this embodiment, the description has been given as to the example where a wide-angle lens or a fish-eye lens is used as the photographing optical system 2 and the photographing is performed while directing the optical axis of the optical system to the zenith as shown in FIG. 2C. However, the present invention is not restricted thereto. The digital camera 100 can be configured so that it can function in the same manner at the time of, e.g., holding the digital camera 100 to effect the photographing as shown in FIG. 2A by using the general optical system. In this case, for example, since the photographer's image is not considered to be acquired, the photographer's finger must be detected by a method different from the above-described example. The photographer's finger can be detected by, e.g., template matching. Furthermore, a photographing optical system and an imaging unit different from the photographing optical system 2 and the imaging unit 3 may be further provided on the side of the digital camera 100 where the first display unit 11 and the first touch panel 12 are provided, and the photographer's gesture may be determined by using an image acquired by this imaging unit.

It is to be noted that, e.g., the order or the like of the processing explained with reference to the flowchart can be appropriately changed in this embodiment. For example, step S401 to step S403, and step S404 described with reference to FIG. 14 may be counterchanged. Further, the orders of various kinds of processing can be counterchanged, these kinds of processing can be partially deleted, or further processing can be added.

Moreover, of the technology described here, it is often the case that the control mainly explained with reference to the flowchart can be set by using a program. This program may be stored in a recording medium or a recording unit. As to how recording takes place in the recording medium or the recording unit, recording may be performed at the time of product shipment, a distributed recording medium may be used for recording, or downloading via the Internet may be used for recording.

Furthermore, the technology according to the present invention is not restricted to the digital camera, and can be applied to, e.g., a digital video camera and an electronic device such as a mobile phone or a tablet mobile device having a photographing function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging method comprising:
   performing full-surround photographing of a subject including a photographer to acquire image data;
   determining a motion pointing in a direction of a subject performed by the photographer included in the subject based on the image data;
   outputting an instruction signal corresponding to the motion;
   photographing a subject pointed to by the photographer responsive to the output of the instruction signal; and
   creating a composite image including the photographer based on the image data obtained by performing the photographing more than once and the instruction signal.

2. The method according to claim 1, wherein the determining the motion pointing comprises detecting that the photographer continuously points in a circumferential shape.

3. The method according to claim 1, wherein the determining the motion pointing comprises alternately detecting that the photographer points and that a touch panel is touched.

4. The method according to claim 1, wherein the determining the motion pointing comprises alternately detecting that the photographer points and the photographer performs a separating motion.

5. The method according to claim 1, wherein
   the instruction signal comprises information concerning positions to which the photographer has pointed,
   the performing the photographing comprises performing photographing when a target subject is present at each of the positions, and
   the creating the composite image comprises composing images of the target subject at the respective positions.

6. The method according to claim 5, wherein
   the determining the motion pointing comprises detecting a number of times that the photographer has pointed, and
   the creating the composite image comprises composing the images which corresponds to the number of times in number.

7. The method according to claim 1, wherein
   the composite image includes frames;
   the determining the motion pointing comprises specifying target subjects to which the photographer has pointed;
   the performing the photographing comprises performing photographing after the target subjects are specified, to generate a plurality of photographed images, and
   the creating the composite image comprises clipping an image of each of the target subjects from one of the plurality of photographed images, and placing the clipped images of the target subjects into the frames, thereby creating a combined picture.

8. The method according to claim 7, further comprising:
   displaying the frames in a display unit; and
   detecting a touch input to a touch panel provided in the display unit,
   wherein the creating the composite image comprises repeatedly placing the clipped images into the frames subjected to the touch input.

9. The method according to claim 7, wherein the target subjects are people, and wherein the clipped images of the target subjects are of the target subjects looking towards a lens that was used when the photographing was performed.

10. The method according to claim 1, further comprising determining a line of sight of a person included in a range in which the photographer has pointed and outputting a sight line matching signal when the line of sight is directed toward an imaging apparatus, wherein
    the performing the photographing comprises performing photographing when the sight line matching signal is output, and
    the creating the composite image comprises composing images of the person when the line of sight is directed toward the imaging apparatus.

11. The method according to claim 1, wherein the outputting the instruction signal comprises selecting one of photographing modes based on the pointing motion performed by the photographer.

12. The method according to claim 11, wherein
    the photographing modes comprise at least one of a tip emphasizing mode, a combined picture mode, and a full-member mode,
    in the tip emphasizing mode,
       the instruction signal comprises information concerning positions to which the photographer has pointed,
       the performing the photographing comprises performing photographing when a target subject is present at the respective positions, and
       the creating the composite image comprises composing images of the target subject at the respective positions,
    in the combined picture mode,
       the combined image includes frames,
       the determining the pointing motion comprises specifying the target subject to which the photographer has pointed,
       the performing the photographing comprises performing photographing after the target subject is specified, and
       the creating the composite image comprises clipping images of the target subject from the respective image data, placing the images of the target subject into the frames, respectively, and thereby creating a combined picture, and
    in the full-member mode,
       the method further comprises determining a line of sight of a person included in a range to which the photographer has pointed and outputting a sight line matching signal when the line of sight is directed toward an imaging apparatus,
       the performing the photographing comprises performing photographing when the sight line matching signal is output, and
       the creating the composite image comprises composing images of the person when the line of sight is directed toward the imaging apparatus.

13. The method according to claim 1, wherein
    an optical system used for the photographing comprises a wide-angle lens or a fish-eye lens, and
    the photographing is performed while directing an optical axis of the optical system toward a zenith direction.

14. An imaging apparatus comprising:
    an optical system which forms an image of light from a full-surrounding subject including a photographer;
    an imaging unit which performs full-surround photographing for acquiring image data of the subject formed by the optical system;
    an operation determination unit which determines a motion pointing in a direction of a subject performed by the photographer included in the subject based on the image data and outputs an instruction signal corresponding to the motion;

an imaging control unit which controls the photographing subject pointed to by the photographer; and an image composition unit which creates a composite image including the photographer based on the image data obtained by the photographing performed more than once and the instruction signal.

15. The apparatus according to claim 14, wherein the operation determination unit outputs the instruction signal comprising information concerning positions to which the photographer has pointed, the imaging control unit causes the imaging unit to perform the photographing when a target subject is present at the respective positions, and the image composition unit composes images of the target subject at the respective positions and thereby creates the composite image.

16. The apparatus according to claim 14, wherein the composite image includes frames, the operation determination unit specifies target subjects to which the photographer has pointed, the imaging control unit causes the imaging unit to perform the photographing after the target subjects are specified, to generate a plurality of photographed images, and the image composition unit clips an image of each of the target subjects from the one of the plurality of photographed images, places the clipped images of the target subjects into the frames, and thereby creates the composite image which is a combined picture.

17. The apparatus according to claim 16, wherein the target subjects are people, and wherein the clipped images of the target subjects are of the target subjects looking towards a lens that was used when the photographing was performed.

18. The apparatus according to claim 14, further comprising a sight line determination unit which determines a line of sight of a person included in a range to which the photographer has pointed and outputs a sight line matching signal when the line of sight is directed toward the optical system, wherein the imaging control unit causes the imaging unit to perform the photographing when the sight line matching signal is output from the sight line determination unit, and the image composition unit composes images of the person when the line of sight is directed toward the optical system and thereby creates the composite image.

19. The apparatus according to claim 14, wherein the optical system comprises a wide-angle lens or a fish-eye lens and is configured to direct an optical axis of the optical system toward a zenith direction while performing the photographing.

20. A non-transitory computer readable medium comprising a code which causes a computer to execute:

performing full-surround photographing of a subject including a photographer to acquire image data;

determining a motion pointing in a direction of a subject performed by the photographer included in the subject based on the image data;

outputting an instruction signal corresponding to the motion;

photographing a subject pointed to by the photographer; and creating a composite image including the photographer based on the image data obtained by the performing the full-surround photographing more than once and the instruction signal.

* * * * *